United States Patent
Adachi

(10) Patent No.: US 10,433,150 B2
(45) Date of Patent: Oct. 1, 2019

(54) COMMUNICATION METHOD, RADIO TERMINAL, PROCESSOR AND BASE STATION

(71) Applicant: KYOCERA CORPORATION, Kyoto (JP)

(72) Inventor: Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 10 days.

(21) Appl. No.: 15/727,872

(22) Filed: Oct. 9, 2017

(65) Prior Publication Data

US 2018/0049016 A1 Feb. 15, 2018

Related U.S. Application Data

(63) Continuation of application No. PCT/JP2016/061430, filed on Apr. 7, 2016.

(30) Foreign Application Priority Data

Apr. 10, 2015 (JP) .................. 2015-080483

(51) Int. Cl.
*H04W 8/00* (2009.01)
*H04W 72/14* (2009.01)
(Continued)

(52) U.S. Cl.
CPC ............. *H04W 8/005* (2013.01); *H04W 8/00* (2013.01); *H04W 48/16* (2013.01); *H04W 72/04* (2013.01);
(Continued)

(58) Field of Classification Search
CPC .................................................. H04W 8/005
See application file for complete search history.

(56) References Cited

U.S. PATENT DOCUMENTS

| 2015/0257186 A1 | 9/2015 | Fukuta |
| 2016/0192171 A1 | 6/2016 | Takano |
| 2016/0295623 A1* | 10/2016 | Kazmi .................. H04W 76/14 |

FOREIGN PATENT DOCUMENTS

| WO | 2014/069221 A1 | 5/2014 |
| WO | 2015/045556 A1 | 4/2015 |

OTHER PUBLICATIONS

"3GPP TSG RAN WG2 Meeting #85bis", Apr. 4, 2014, Samsung (Year: 2014).*

(Continued)

*Primary Examiner* — John D Blanton
(74) *Attorney, Agent, or Firm* — Studebaker & Brackett PC

(57) ABSTRACT

A communication method including transmitting, from a radio terminal connected to a cell to a base station managing the cell operated in a first frequency, a first message that a discovery signal is transmitted for public safety in a second frequency; receiving, by the base station, the first message; and transmitting, from the base station to the radio terminal, a second message including information on radio resources to be used in transmission of the discovery signal in the second frequency, based on the first message. The method further includes transmitting, from the base station to the radio terminal, first information and second information. The first information indicates a threshold value for determining whether or not the radio terminal transmits the first message. The radio terminal uses the second information to determine whether or not the radio terminal is allowed to transmit the first message.

7 Claims, 6 Drawing Sheets

(51) Int. Cl.
  *H04W 92/18* (2009.01)
  *H04W 76/14* (2018.01)
  *H04W 48/16* (2009.01)
  *H04W 72/04* (2009.01)
  *H04W 92/16* (2009.01)
(52) U.S. Cl.
  CPC ........... *H04W 72/14* (2013.01); *H04W 76/14* (2018.02); *H04W 92/16* (2013.01); *H04W 92/18* (2013.01)

(56) References Cited

OTHER PUBLICATIONS

International Search Report issued in PCT/JP2016/061430; dated Jun. 28, 2016.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; 3GPP TS 36.300 V12.5.0; Mar. 2015; pp. 1-251; Release 12; 3GPP Organizational Partners.
Samsung; "Signaling Flows for Type 2B Resource Allocation"; 3GPP TSG RAN WG2 Meeting #85bis; R2-141388; Mar. 31-Apr. 4, 2014; pp. 1-6; Valencia, Spain.
Qualcomm; "Enhanced LTE D2D Proximity Services: Release 13 D2D WI"; 3GPP TSG RAN #66; RP-141905; Dec. 8-11, 2014; pp. 1-10; Maui, USA.

* cited by examiner

COMMUNICATION METHOD, RADIO TERMINAL, PROCESSOR AND BASE STATION

RELATED APPLICATIONS

This application is a continuation application of international application PCT/JP2016/061430, filed Apr. 7, 2016, which claims benefit of Japanese Patent Application No. 2015-080483, filed Apr. 10, 2015, the entirety of all applications hereby expressly incorporated by reference.

TECHNICAL FIELD

The subject application relates to a communication method, a radio terminal, a processor, and a base station.

BACKGROUND ART

In the 3rd Generation Partnership Project (3GPP), which is a mobile communication system standardization project, the formulation of specifications of a Device to Device Proximity Service (D2D ProSe) is promoted.

As modes of the D2D ProSe, two modes including direct discovery and direct communication are defined.

Here, the direct discovery is a mode for searching for another radio terminal by directly transmitting, between radio terminals, a discovery signal without a specified specific destination. The direct communication is a mode for directly transmitting data between radio terminals by specifying a specific destination (destination group).

SUMMARY

A communication method according to an embodiment comprises: a step of transmitting, from a radio terminal connecting to a cell to a base station managing the cell operated in a first frequency, a first message including information indicating that a discovery signal is transmitted for public safety in order to transmit the discovery signal in a second frequency band different from the first frequency; a step of receiving, by the base station, the first message; and a step of transmitting, from the base station to the radio terminal, a second message including information on radio resources to be used in transmission of the discovery signal in the second frequency, on a basis of the first message. The communication method further comprises a step of transmitting, from the base station to the radio terminal, first information and second information, wherein the first information indicates a threshold value to be used for determining whether or not the radio terminal transmits the first message and the second information is to be used for the radio terminal to determine whether or not the radio terminal is allowed to transmit the first message.

A radio terminal according to an embodiment comprises: a transmitter; and a receiver. The transmitter is configured to transmit, to a base station managing a cell operated in a first frequency and to which the radio terminal connected, a first message including information indicating that a discovery signal is transmitted for public safety in order to transmit the discovery signal in a second frequency band different from the first frequency. The receiver is configured to receive, from the base station, a second message based on the first message, wherein the second message includes information on radio resources to be used in transmission of the discovery signal in the second frequency. The receiver is further configured to receive first information and second information from the base station, wherein the first information indicates a threshold value to be used for determining whether or not the radio terminal transmits the first message and the second information is to be used for the radio terminal to determine whether or not the radio terminal is allowed to transmit the first message.

A processor according to an embodiment is a processor for controlling a radio terminal. The processor is configured to execute processes of: transmitting, to a base station managing a cell operated in a first frequency and to which the radio terminal connected, a first message including information indicating that a discovery signal is transmitted for public safety in order to transmit the discovery signal in a second frequency band different from the first frequency; and receiving, from the base station, a second message based on the first message, wherein the second message includes information on radio resources to be used in transmission of the discovery signal in the second frequency. The processer is further configured to execute a process of receiving first information and second information from the base station, wherein the first information indicates a threshold value to be used for determining whether or not the radio terminal transmits the first message and the second information is to be used for the radio terminal to determine whether or not the radio terminal is allowed to transmit the first message.

A base station according to an embodiment is configured to manage a cell operated in a first frequency. The base station comprises: a receiver; and a transmitter. The receiver is configured to receiver, from a radio terminal connecting to the cell, a first message including information indicating that a discovery signal is transmitted for public safety in order for the radio terminal to transmit the discovery signal in a second frequency band different from the first frequency. The transmitter is configured to transmit, to the radio terminal, a second message including information on radio resources to be used in transmission of the discovery signal in the second frequency, on a basis of the first message. The transmitter is further configured to transmit first information and second information to the radio terminal, wherein the first information indicates a threshold value to be used for determining whether or not the radio terminal transmits the first message and the second information is to be used for the radio terminal to determine whether or not the radio terminal is allowed to transmit the first message.

DESCRIPTION OF EMBODIMENTS

Overview of Embodiment

Figure 1:
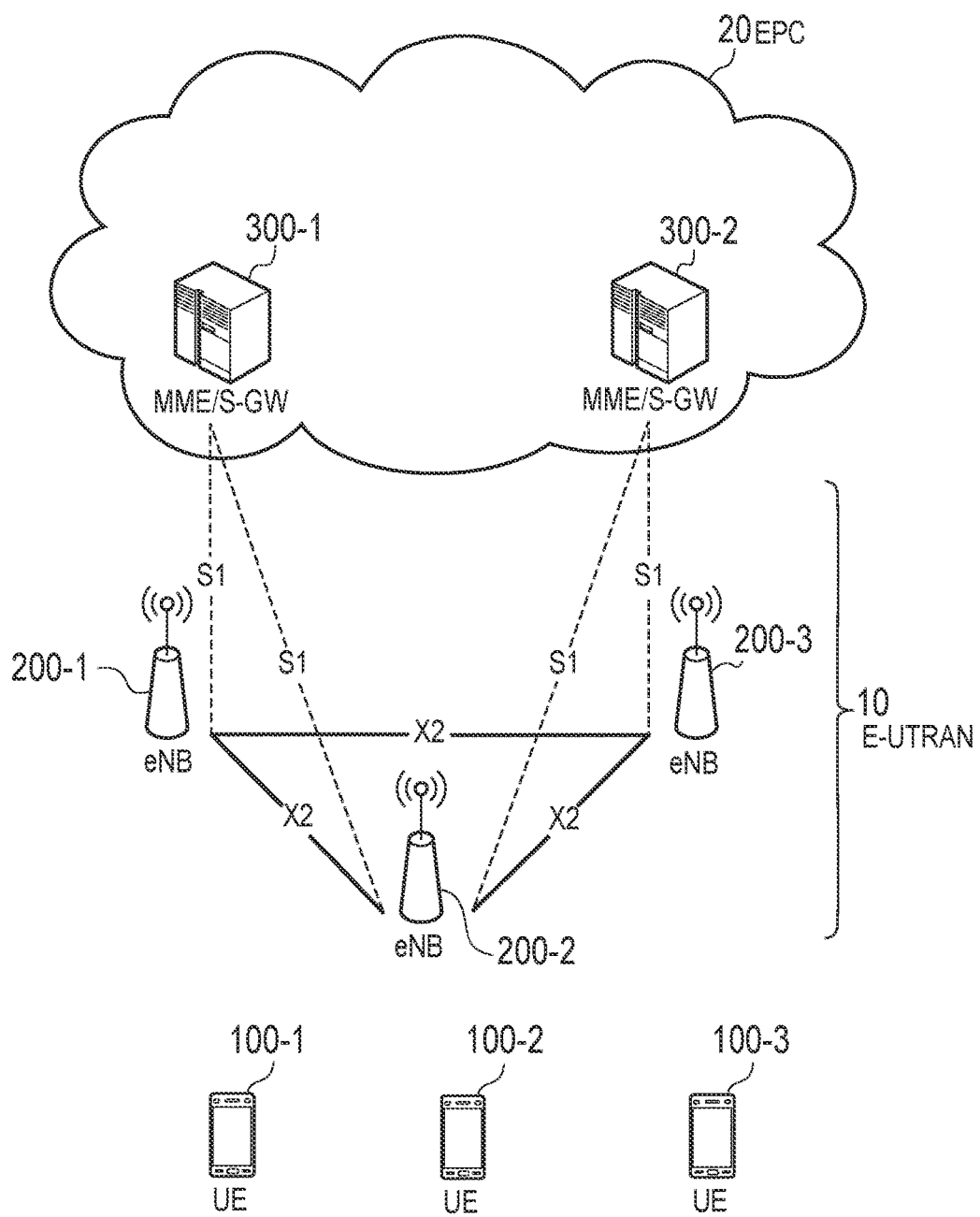
FIG. 1 is a configuration diagram of a Long Term Evolution (LTE) system.

Nevertheless, in the present circumstances, the D2D ProSe may fail to be effectively utilized because specifications for effectively utilizing the D2D ProSe relaying have not been adequately formulated.

A base station according to an embodiment manages a cell operated in a first frequency band. The base station comprises: a receiver configured to receive, from a radio terminal connecting to the cell, a message requesting permission for the radio terminal to transmit a discovery signal in a second frequency band different from the first frequency band; and a controller configured to determine whether to permit transmission of the discovery signal in the second frequency band.

The controller may determine whether to permit transmission of the discovery signal in the second frequency band, by regarding, as the message, a predetermined message including information indicating that the discovery signal is transmitted for public safety.

The message may include information indicating a reception level of a radio signal received by the radio terminal from the cell.

The controller may permit transmission of the discovery signal if the reception level is less than a threshold value.

The controller may transmit, to the radio terminal, a response message indicating whether to permit transmission of the discovery signal in the second frequency band.

The response message may include resource information that specifies a radio resource used in transmission of the discovery signal. The response message may include pool information that specifies a predetermined resource pool including a radio resource used in transmission of the discovery signal.

The predetermined resource pool is part of a resource pool pre-configured in the radio terminal.

A radio terminal according to an embodiment connects to a cell operated in a first frequency band. The radio terminal comprises: a controller configured to transmit, to a base station configured to manage the cell, a message requesting permission for transmitting a discovery signal in a second frequency band different from the first frequency band.

The controller may transmit, as the message, a predetermined message including information indicating that the discovery signal is transmitted for public safety.

The controller may transmit the message only if a reception level of a radio signal from the cell is less than a threshold value.

The controller may include information indicating a reception level of a radio signal from the cell, in the message.

The radio terminal may further comprise a receiver configured to receive, from the cell, a response message indicating whether to permit transmission of the discovery signal in the second frequency band. The controller may start transmission of the discovery signal if transmission of the discovery signal is permitted.

The response message may include resource information that specifies a radio resource used in transmission of the discovery signal. The controller may transmit the discovery signal using the radio resource specified by the resource information.

The response message may include pool information that specifies a predetermined resource pool used in transmission of the discovery signal. The controller may transmit the discovery signal using a radio resource in the predetermined resource pool specified by the pool information.

The predetermined resource pool may be part of a resource pool pre-configured in the radio terminal.

The controller may transmit periodically and/or aperiodically a radio signal for another radio terminal to perform synchronization, if transmission of the discovery signal is permitted.

Embodiment (Mobile Communication System)

Hereinafter, an LTE system being a mobile communication system according to a first embodiment will be described. FIG. 1 is a configuration diagram of an LTE system.

As shown in FIG. 1, the LTE system comprises UEs (User Equipments) 100, E-UTRAN (Evolved Universal Terrestrial Radio Access Network) 10, and EPC (Evolved Packet Core) 20.

The UE 100 corresponds to a radio terminal. The UE 100 is a mobile communication device. The UE 100 performs radio communication with a connected cell (a serving cell). Configuration of the UE 100 will be described later.

The E-UTRAN 10 corresponds to a radio access network. The E-UTRAN 10 includes eNBs (evolved Node-Bs) 200. The eNB 200 corresponds to a base station. The eNBs 200 are connected mutually via an X2 interface. Configuration of the eNB 200 will be described later.

The eNB 200 manages a cell or a plurality of cells. The eNB 200 performs radio communication with the UE 100 that establishes a connection with the cell of the eNB 200. The eNB 200, for example, has a radio resource management (RRM) function, a function of routing user data (hereinafter, simply referred to as "data"), and a measurement control function for mobility control and scheduling. The "cell" is used as a term indicating a minimum unit of a radio communication area. It may be also used as a term indicating a function of performing radio communication with the UE 100.

The EPC 20 corresponds to a core network. The EPC 20 comprises MME (Mobility Management Entity)/S-GW (Serving-Gateway) 300. The MME performs various mobility controls and the like, for the UE 100. The S-GW performs control to transfer user data. The MME/S-GW 300 is connected to the eNB 200 via an S1 interface. The E-UTRAN 10 and the EPC 20 constitute a network.

Figure 2:
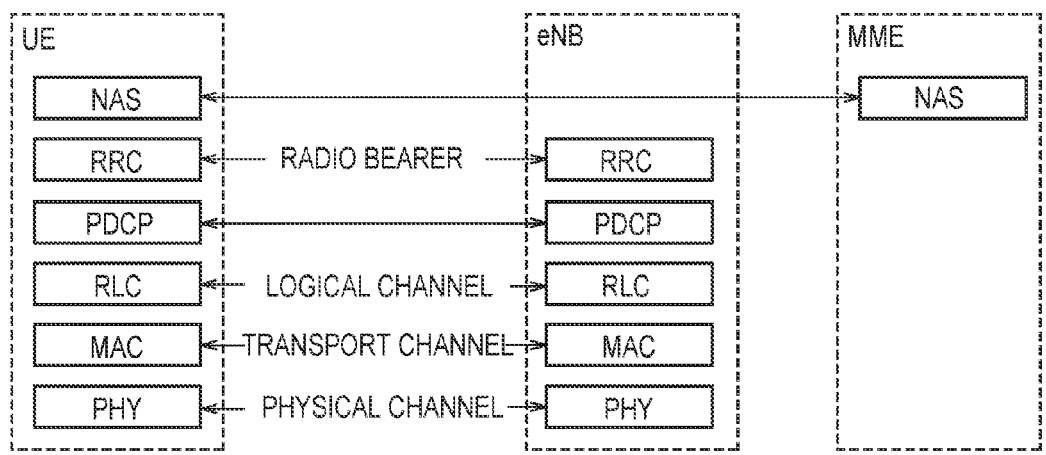
FIG. 2 is a protocol stack diagram of a radio interface in the LTE system.

FIG. 2 is a protocol stack diagram of a radio interface in the LTE system. As shown in FIG. 2, the radio interface protocol is classified into a layer 1 to a layer 3 of an OSI reference model. The layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and a control signal are transmitted through the physical channel.

The MAC layer performs priority control of data, a retransmission process by hybrid ARQ (HARQ), a random access procedure, and the like. Between the MAC layer of the UE 100 and the MAC layer of the eNB 200, data and a control signal are transmitted via a transport channel. The MAC layer of the eNB 200 includes a scheduler. The scheduler determines a transport format of an uplink and a downlink (a transport block size, a modulation and coding scheme (MCS)) and an allocated resource block to the UE 100.

The RLC layer transmits data to an RLC layer of a reception side by using the functions of the MAC layer and the PHY layer. Between the RLC layer of the UE 100 and the RLC layer of the eNB 200, data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a message (an RRC message) for various types of setting is transmitted. The RRC layer controls the logical channel, the transport channel, and the physical channel in response to establishment, re-establishment, and release of a radio bearer. When a connection (an RRC connection) is established between the RRC layer of the UE 100 and the RRC layer of the eNB 200, the UE 100 is in an RRC connected state (a connected state). When the connection is not established between the RRC layer of the UE 100 and the RRC layer of the eNB 200, the UE 100 is in an RRC idle state (an idle state).

NAS (Non-Access Stratum) layer positioned above the RRC layer performs session management, mobility management and the like.

Figure 3:
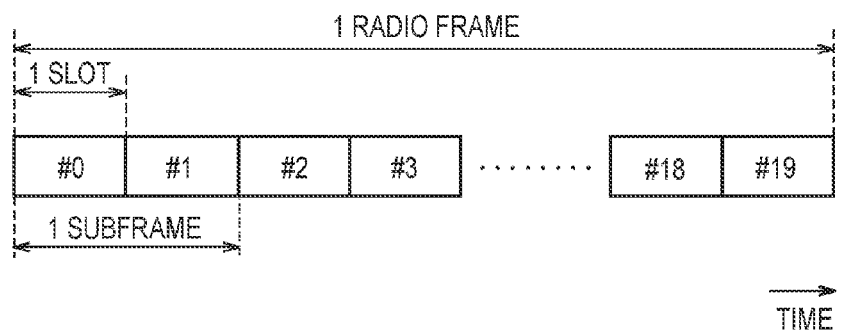
FIG. 3 is a configuration diagram of a radio frame used in the LTE system.

FIG. 3 is a configuration diagram of a radio frame used in the LTE system. In the LTE system, OFDMA (Orthogonal Frequency Division Multiplexing Access) is employed in a downlink (DL). SC-FDMA (Single Carrier Frequency Division Multiple Access) is employed in an uplink (UL).

As shown in FIG. 3, the radio frame is configured by 10 subframes arranged in a time direction. Each subframe is configured by two slots arranged in the time direction. Each subframe has a length of 1 ms. Each slot has a length of 0.5 ms. Each subframe includes a plurality of resource blocks (RBs) in a frequency direction. Each subframe includes a plurality of symbols in the time direction. Each resource block includes a plurality of subcarriers in the frequency direction. A resource element (RE) is configured by one symbol and one subcarrier. In addition, among radio resources (time-frequency resources) allocated to the UE 100, a frequency resource is specified by a resource block and a time resource is specified by a subframe (or slot).

In the downlink, an interval of several symbols at the head of each subframe is a region mainly used as a physical downlink control channel (PDCCH) for transmission of a downlink control signal. The details of the PDCCH will be described later. Furthermore, the remaining part of each subframe is a region which can be mainly used as a physical downlink shared channel (PDSCH) for transmission of a downlink data.

In the uplink, both end portions in the frequency direction of each subframe are regions mainly used as a physical uplink control channel (PUCCH) for transmission of an uplink control signal. Furthermore, the remaining part of each subframe is a region which can be mainly used as a physical uplink shared channel (PUSCH) for transmission of an uplink data.

(Direct Discovery)

In the D2D ProSe, a plurality of UEs 100 transmit and receive various signals via a direct radio link not passing through an eNB 200. As modes of the D2D ProSe, two modes including "direct discovery" and "direct communication" are defined. The direct radio link in the D2D ProSe will be referred to as a "sidelink".

The "sidelink" is a UE-to-UE interface for direct discovery and direct communication. The "sidelink" corresponds to a PC5 interface. The PC5 is a reference point between UEs that can use the D2D ProSe used for control for UE-NW relaying using direct discovery, direct communication, and the D2D ProSe, and for a user plane. The D2D ProSe will be described below mainly using the direct discovery.

The direct discovery is a mode for searching for another UE by directly transmitting, between UEs, a discovery signal without a specified specific destination. In addition, the direct discovery is a procedure for discovering another UE 100 in the neighborhood of the UE 100, using a direct radio signal in an Evolved Universal Terrestrial Radio Access (E-UTRA) via the PC5. The direct discovery is supported only if the UE 100 is provided with a service by an E-UTRAN (the eNB 200 (cell)). If the UE 100 is connected to the cell (the eNB 200) or exists in the cell, the service is provided by the E-UTRAN.

Figure 4:
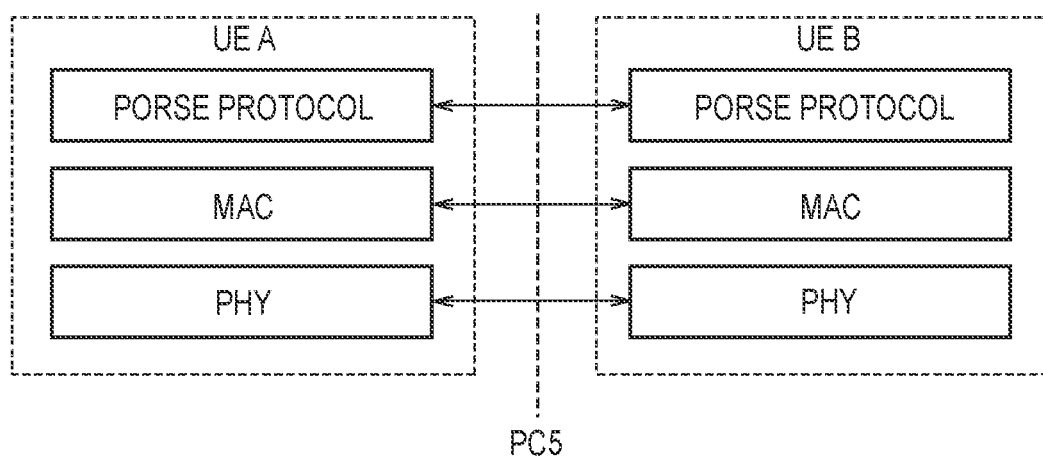
FIG. 4 is a protocol stack diagram of "Sidelink Direct Discovery".

FIG. 4 is a protocol stack diagram of "direct discovery (Sidelink Direct Discovery)". As illustrated in FIG. 4, a "Sidelink Direct Discovery" protocol stack includes a physical (PHY) layer, a medium access control (MAC) layer, and a ProSe protocol. Between the PHY layer of a UE (A) and the PHY layer of a UE (B), a discovery signal is transmitted via a physical channel referred to as a physical sidelink discovery channel (PSDCH). Between the MAC layer of the UE (A) and the MAC layer of the UE (B), a discovery signal is transmitted via a transport channel referred to as a sidelink discovery channel (SL-DCH).

Resource allocation types for transmitting (announcement of) a discovery signal (discovery message) include a "type 1" in which the UE 100 selects a radio resource, and a "type 2 (type 2B)" in which the eNB 200 selects a radio resource.

The "type 1" is a resource allocation procedure in which a radio resource for transmission of a discovery signal is not uniquely allocated to a UE. In the "type 1", the UE 100 autonomously selects a radio resource from a resource pool used for the transmission of a discovery signal. The UE 100 transmits a discovery signal using the selected radio resource. The eNB 200 provides the UE 100 with a resource pool configuration used for the transmission of a discovery signal. The eNB 200 can provide the UE 100 with the resource pool configuration by a broadcast signal or an individual signal.

The "type 2" is a resource allocation procedure in which a radio resource for the transmission of a discovery signal is uniquely allocated to a UE. In the "type 2", the eNB 200 allocates a radio resource to the UE 100 via an RRC message. The UE 100 transmits a discovery signal using the radio resource allocated from the eNB 200.

In addition, in the "type 1", if the UE 100 is located within the cell coverage, the UE 100 transmits a discovery signal using a radio resource in a resource pool provided in a frequency band in which a serving cell is operated. In contrast, if the UE 100 is located outside the cell coverage, the UE 100 uses a pre-configured resource pool. In addition, in the "type 2", a radio resource in a frequency band in which the serving cell is operated is allocated to the UE 100. The UE 100 transmits a discovery signal using the radio resource.

(Radio Terminal)

Figure 5:
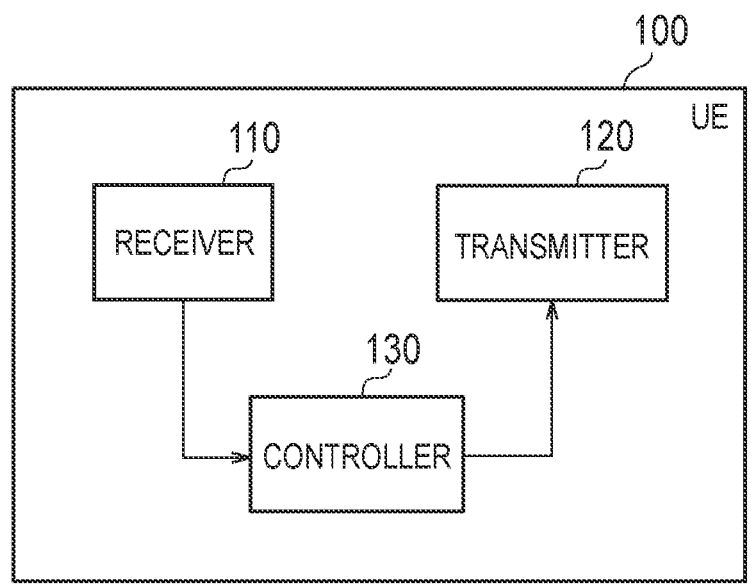
FIG. 5 is a block diagram of user equipment (UE) 100.

The UE 100 (radio terminal) according to the embodiment will be described below. FIG. 5 is a block diagram of the UE 100. As illustrated in FIG. 5, the UE 100 comprises a receiver 110, a transmitter 120, and a controller 130.

The receiver 110 performs various types of reception under the control of the controller 130. The receiver 110 comprises an antenna and a receiving device. The receiving device converts a radio signal received by the antenna, into a baseband signal (reception signal), and outputs the baseband signal to the controller 130.

In addition, if the UE 100 supports the D2D ProSe for public safety, the receiver 110 can simultaneously receive radio signals in two different frequencies. For example, the UE 100 comprises two receiving devices (2 RX Chain). The UE 100 can receive a radio signal for cellular using one receiving device, and can receive a radio signal for the D2D ProSe using the other receiving device.

The transmitter 120 performs various types of transmission under the control of the controller 130. The transmitter 120 comprises an antenna and a transmission device. The transmission device converts a baseband signal (transmission signal) output by the controller 130, into a radio signal, and transmits the radio signal from the antenna.

The controller 130 performs various types of control in the UE 100. The controller 130 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor may comprise a codec that performs encoding/decoding of an audio/video signal. The processor executes various types of processing to be described later and various types of communication protocols mentioned above.

(Base Station)

Figure 6:
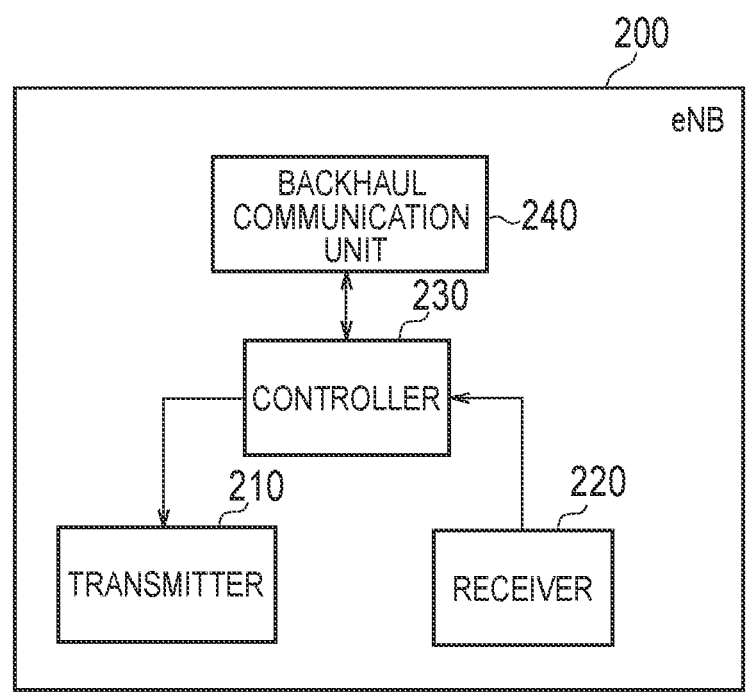
FIG. 6 is a block diagram of an evolved Node-B (eNB) 200.

The eNB 200 (base station) according to the embodiment will be described below. FIG. 6 is a block diagram of the eNB 200. As illustrated in FIG. 6, the eNB 200 comprises a transmitter 210, a receiver 220, a controller 230, and a backhaul communication unit 240.

The transmitter 210 performs various types of transmission under the control of the controller 230. The transmitter 210 comprises an antenna and a transmission device. The transmission device converts a baseband signal (transmission signal) output by the controller 230, into a radio signal, and transmits the radio signal from the antenna.

The receiver 220 performs various types of reception under the control of the controller 230. The receiver 220 comprises an antenna and a receiving device. The receiving device converts a radio signal received by the antenna, into a baseband signal (reception signal), and outputs the baseband signal to the controller 230.

The controller 230 performs various types of control in the eNB 200. The controller 230 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor executes various types of processing to be described later and various types of communication protocols mentioned above.

The backhaul communication unit 240 is connected to a neighboring eNB 200 via an X2 interface. The backhaul communication unit 240 is connected to a MME/S-GW 300 via an S1 interface. The backhaul communication unit 240 is used for communication performed on the X2 interface, communication performed on the S1 interface, and the like.

(Operation According to Embodiment)

Figure 7:
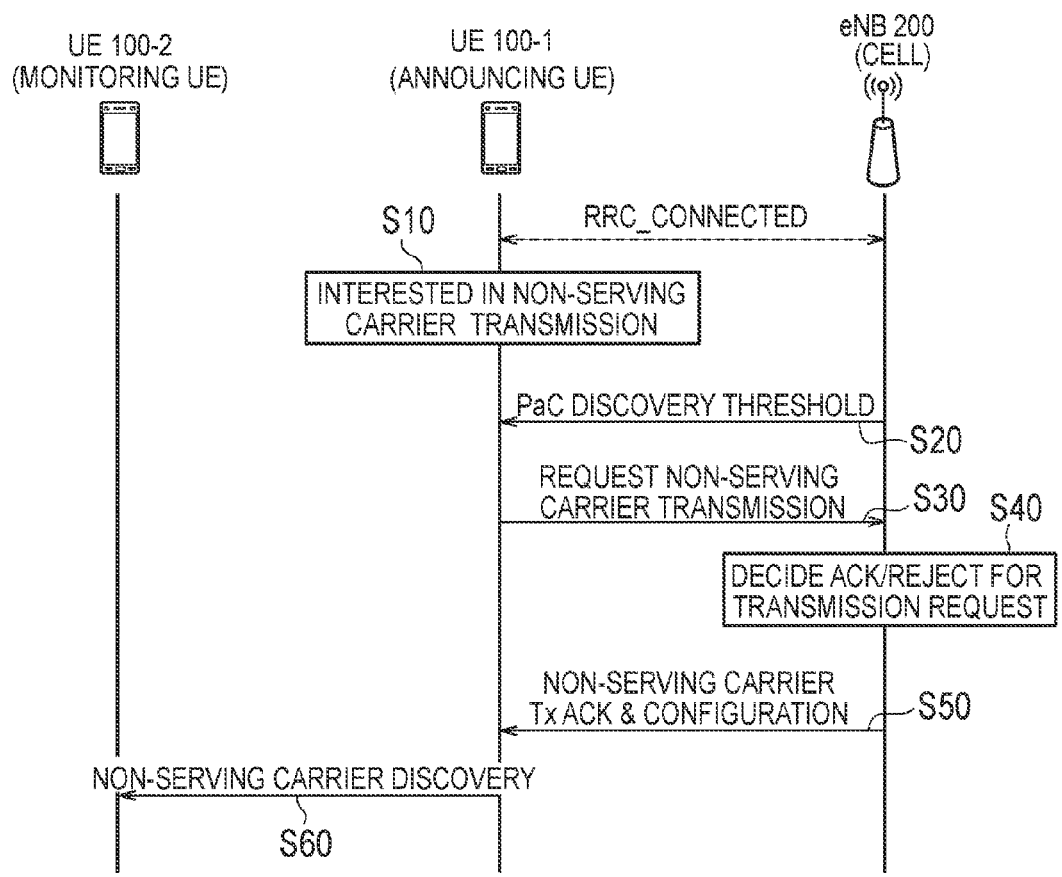
FIG. 7 is a sequence diagram for illustrating an operation according to an embodiment.
Figure 8:
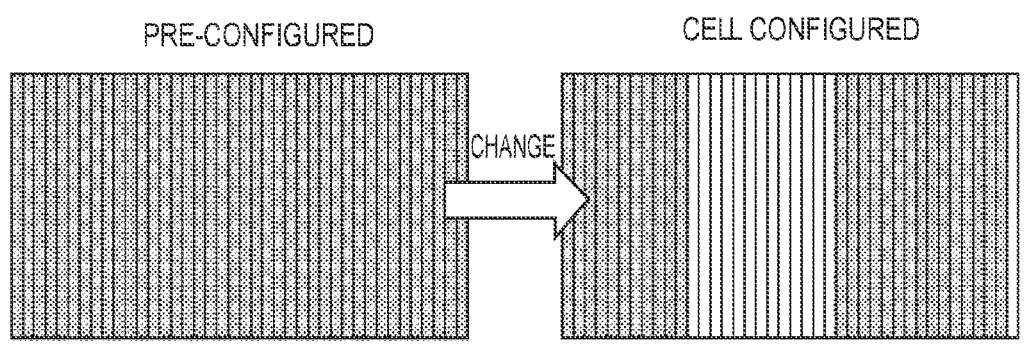
FIG. 8 is a diagram for illustrating an operation according to the embodiment.

Next, an operation according to the embodiment will be described using FIG. 7. FIG. 7 is a sequence diagram for illustrating an operation according to the embodiment. FIG. 8 is a diagram for illustrating an operation according to the embodiment.

As illustrated in FIG. 7, a mobile communication system according to the embodiment includes a UE 100-1 (Announcing UE), a UE 100-2 (Monitoring UE), and an eNB 200.

In addition, RRC connection is established between the UE 100-1 and a cell (the eNB 200) operated in a first frequency band. In other words, the UE 100-1 establishes the RRC connection with the cell (serving cell). The UE 100-1 is in an RRC connected state. The UE 100-1 is located within the cell coverage (In coverage). In contrast, the UE 100-2 is located outside the cell coverage (Out of coverage). The UE 100-2 is in an RRC idle state.

A case in which the UE 100-1 desires to transmit a discovery signal to a UE located outside the coverage of a serving cell, in a state of being connected to the serving cell will now be assumed. In the current specification, a method for transmitting a discovery signal in this case is not defined. Thus, the UE 100-1 loses an opportunity to transmit a discovery signal. As a result, the D2D ProSe may fail to be effectively utilized.

Especially in a case in which a radio resource (resource pool) for transmitting a discovery signal is not provided in the first frequency band in which the serving cell is operated, an opportunity to transmit a discovery signal is further lost.

A method for effectively utilizing the D2D ProSe will be described below.

As illustrated in FIG. 7, in step S10, the UE 100-1 becomes interested in transmitting a discovery signal in a frequency band different from the first frequency band.

For example, the UE 100-1 determines that the UE 100-1 desires to transmit information for public safety (Public Safety) using a discovery signal, for a UE 100 located outside the cell coverage (Out of coverage). A resource pool for transmitting (receiving) a discovery signal if the UE 100 is located outside the cell coverage is pre-configured in the UE 100-1. If the first frequency band (serving carreier) in which the serving cell is operated and a second frequency band (non-serving carreier) in which the pre-configured resource pool is provided are different, the UE 100-1 becomes interested in transmitting a discovery signal in the second frequency band different from the first frequency band.

In addition, examples of the information for public safety include information related to disasters (earthquake, fire disaster, etc.), information used by people involved in fire companies or people involved in police, and the like. In addition, for example, the pre-configured resource pool may be a resource pool configured from the eNB 200 when connection with the cell (the eNB 200) is established, or may be a resource pool configured before connection with the cell (the eNB 200) is established. Alternatively, the pre-configured resource pool needs not be a resource pool configured from the eNB 200, and may be a resource pool prestored in a memory of the UE 100.

In step S20, the eNB 200 transmits information indicating a threshold value (PaC discovery threshold value) for determining whether the UE 100 is in a partial coverage (Partial coverage) state. The eNB 200 may transmit the information of the threshold value to the UE 100-1 using an individual signal. The eNB may transmit the information of the threshold value to the UE 100-1 using a broadcast signal. The UE 100-1 receives the information indicating the threshold value, from the eNB 200. The threshold value is a value larger than a reception level of a radio signal received from the cell if the UE 100-1 is located outside the cell coverage. In addition, the threshold value is a value smaller than a reception level of a radio signal received from the cell if the UE 100-1 is located near the center of the cell.

The UE 100-1 compares a reception level of a radio signal from the serving cell, with the threshold value. For example, the UE 100-1 compares received power (reference signal received power (RSRP)) of a radio signal (reference signal) from the serving cell, with the threshold value. If the received power (reception level) is less than the threshold value, the UE 100-1 determines that the UE 100-1 is in the partial coverage state. Alternatively, the UE 100-1 compares received quality (reference signal received quality (RSRQ)) of a radio signal (reference signal) from the serving cell, with the threshold value. If the received quality (reception level) is less than the threshold value, the UE 100-1 determines that the UE 100-1 is in the partial coverage state. If the UE 100-1 is in the partial coverage state, the UE 100-1 is located not near the center of the serving cell but near an end portion of the serving cell.

If the UE 100-1 is in the partial coverage state, the UE 100-1 executes processing in step S30. If the UE 100-1 is not in the partial coverage state, the UE 100-1 needs not execute the processing in step S30. More specifically, the UE 100-1 may transmit a message in step S30 that is to be described later, only if the reception level of a radio signal from the serving cell is less than the threshold value. If the reception level of a radio signal from the serving cell is not less than the threshold value, the UE 100-1 needs not transmit the message.

The UE 100-1 can deliver a discovery signal to a broader range outside the cell coverage when being near the end portion of the cell than when being near the center of the cell. Thus, if the UE 100-1 desires to transmit a discovery signal for a UE 100 located outside the cell coverage, the UE 100-1 determines whether to transmit the message in step S30, based on the threshold value. As a result, inefficient transmission of a discovery signal can be suppressed.

In addition, if the UE 100-1 receives a discovery signal from another UE 100 in the second frequency band, the UE 100-1 may determine to transmit the message in step S30. The UE 100-1 can thereby transmit a discovery signal with knowledge that another UE 100 exists near the UE 100-1.

Alternatively, if a reception level (RSRP and/or RSRQ) of a discovery signal received from another UE 100 exceeds a second threshold value, the UE 100-1 may transmit the message in step S30. The UE 100-1 can thereby notice that another UE 100 exists near the UE 100-1. As a result, inefficient transmission of a discovery signal can be suppressed.

In addition, the processing in step S20 may be omitted.

In step S30, the UE 100-1 transmits, to the eNB 200 (serving cell), a message requesting permission for transmitting a discovery signal in the second frequency band (non-serving carrier) different from the first frequency band (serving carrier). The eNB 200 receives the message.

The UE 100-1 may transmit, as the message, a predetermined message including information indicating that a discovery signal is transmitted for public safety (e.g., flag information represented in one-bit).

The UE 100-1 may include information indicating a reception level (RSRP and/or RSRQ) of a radio signal from the serving cell, in the message.

The UE 100-1 may use, as the message requesting the permission, "SideLink (SL) UE Information" being a message related to the D2D ProSe. Alternatively, the UE 100-1 may use an RRC message as the message requesting the permission. For example, the UE 100-1 may use, as the message requesting the permission, an RRC message used when the RRC connection is established.

In step S40, the eNB 200 that has received the message from the UE 100-1 determines whether to permit the UE 100-1 to transmit a discovery signal in the second frequency band.

If the eNB 200 receives the predetermined message including the information indicating that a discovery signal is transmitted for public safety, the eNB 200 may regard the predetermined message as the message requesting permission for transmitting a discovery signal in the second frequency band (non-serving carrier) different from the first frequency band (serving carrier). The eNB 200 can thereby determine that a message received from the UE 100-1 is the message requesting the permission, even if a new message is not defined.

If a message from the UE 100-1 includes information indicating a reception level of a radio signal from the serving cell, the eNB 200 may determine whether to permit the transmission of a discovery signal, based on the information. More specifically, if the reception level is less than a threshold value, the eNB 200 permits the transmission of a discovery signal. The eNB 200 can thereby permit not a UE 100 located near the center of the serving cell, but a UE 100 located near the end portion of the serving cell to transmit a discovery signal. In other words, the eNB 200 can permit only a UE 100 that can deliver a discovery signal to a broad range outside the cell coverage.

If the eNB 200 permits the transmission of a discovery signal, the eNB 200 can specify a radio resource used in the transmission of a discovery signal. More specifically, the eNB 200 performs scheduling so that a transmission timing of an uplink cellular signal and a transmission timing of a discovery signal do not match. More specifically, the eNB 200 allocates, to the UE 100-1, a radio resource used in the transmission of a discovery signal so that a radio resource used in uplink cellular communication that is to be allocated to the UE 100-1 and a radio resource used in the transmission of a discovery signal do not overlap in a time direction. This can suppress such a situation that the UE 100-1 can execute only one of transmission of a cellular signal and transmission of a discovery signal, even if the UE 100-1 includes only one transceiver.

In addition, if the eNB 200 permits the transmission of a discovery signal, the eNB 200 can specify a transmission resource pool including a radio resource used in the transmission of a discovery signal. More specifically, the eNB 200 allocates a transmission resource pool to the UE 100-1 so that a radio resource used in uplink cellular communication that is to be allocated to the UE 100-1 and a transmission resource pool including a radio resource used in the transmission of a discovery signal do not overlap in the time direction. As illustrated in FIG. 8, the eNB 200 may specify part of a resource pool (pre-configured (resource pool)) pre-configured in the UE 100-1, as a transmission resource pool. The pre-configured resource pool is a transmission resource pool and/or a reception resource pool. The eNB 200 allocates a radio resource used in cellular communication, in a region (time region) not specified as the transmission resource pool. In FIG. 8 (right diagram), a region not specified as the transmission resource pool is a portion without hatching (Cell configured).

In addition, if the eNB 200 does not know information of a resource pool pre-configured in the UE 100-1, the eNB 200 may inquire of the UE 100-1 or a network apparatus about information of the resource pool pre-configured in the UE 100-1. The network apparatus is an apparatus that manages information of a resource pool.

In step S50, the eNB 200 transmits, to the UE 100-1, a response message indicating whether to permit the transmission of a discovery signal in the second frequency band. For example, the eNB 200 can transmit the response message to the UE 100 using the RRC message. More specifically, the eNB 200 can transmit an RRC connection reconfiguration (RRCConnectionReconfiguration) message to the UE 100 as the response message.

The eNB 200 may transmit the response message only if the transmission of a discovery signal is permitted. Alternatively, the eNB 200 may transmit the response message if the reception level is less than a threshold value.

If the eNB 200 permits the transmission of a discovery signal, the eNB 200 may include resource information that specifies a radio resource used in the transmission of a discovery signal, in the response message. Alternatively, if the eNB 200 permits the transmission of a discovery signal, the eNB 200 may include pool information that specifies a transmission resource pool including a radio resource used in the transmission of a discovery signal, in the response message.

The resource information and the pool information may include an identifier for distinguishing between a radio resource (transmission resource pool) used in the transmission of a discovery signal in the second frequency band, and resource allocation of a discovery signal in the first frequency band in which the serving cell is operated. Alternatively, the resource information and the pool information may include, for example, frequency band information (E-UTRA Absolute Radio Frequency Channel Number (E-ARFCN)) indicating the second frequency band, and information indicating whether a radio resource (transmission resource pool) is for public safety.

In step S60, the UE 100-1 that has received the response message starts the transmission of a discovery signal if the transmission of a discovery signal is permitted. In contrast, the UE 100-1 cannot transmit a discovery signal if the transmission of a discovery signal is refused.

If the response message includes the resource information, the UE 100-1 transmits a discovery signal using a radio resource specified by the resource information. In addition, if the response message includes the pool information, the UE 100-1 transmits a discovery signal using a radio resource in a transmission resource pool specified by the pool information. If the transmission resource pool specified by the pool information is part of the pre-configured resource pool, the UE 100-1 transmits a discovery signal while prioritizing the pool information. In other words, the UE 100-1 does not use, for the transmission of a discovery signal, a radio resource not included in the transmission resource pool specified by the pool information even if the radio resource is a radio resource in the pre-configured resource pool.

Before starting the transmission of a discovery signal, the UE 100-1 transmits a radio signal for another UE 100 (UE 100 located outside the cell coverage) performing synchronization. The UE 100-2 receives the radio signal for performing synchronization, and is synchronized with the UE 100-1. After that, the UE 100-2 searches for the pre-configured resource pool, and receives a discovery signal from the UE 100-1.

In addition, examples of the radio signal for performing synchronization include a synchronization signal, a radio signal including a "MasterInformationBlock-SL" message, and the like. The synchronization signal (sidelink synchronization signal (SLSS)) is used for synchronization for the D2D ProSe (direct discovery). The "MasterInformationBlock-SL" message includes information transmitted by the UE 100-1 that transmits the synchronization signal. The UE 100 that has received a radio signal including the "MasterInformationBlock-SL" message applies information (bandwidth (sl-Bandwidth) used for the D2D ProSe, subframe assignment (subframeAssignmentSL), a direct frame number (directFrameNumber) and a direct subframe number (directSubframeNumber)) that are included in the "MasterInformationBlock-SL" message.

In addition, if the transmission of a discovery signal is permitted, the UE 100-1 can transmit periodically and/or aperiodically a radio signal for another UE 100 (UE 100 located outside the cell coverage) performing synchronization. In other words, the UE 100-1 repeats the transmission of the radio signal for performing synchronization, while executing the procedure of the direct discovery. If the UE 100-1 ends the procedure of the direct discovery, the UE 100-1 ends the transmission of the radio signal for performing synchronization. The radio signal for performing synchronization can be thereby received from the UE 100-1 even by another UE 100 that has noticed the existence of the UE 100-1 after a predetermined time has elapsed from when the UE 100-1 had started the transmission of a discovery signal. As a result, a larger number of UEs 100 can receive a discovery signal from the UE 100-1.

Summary

In the embodiment, the UE 100-1 transmits, to the eNB 200, a message requesting permission for transmitting a discovery signal in the second frequency band (non-serving carrier) different from the first frequency band (serving carrier). The eNB 200 determines whether to permit the transmission of a discovery signal in the second frequency band. The eNB 200 can thereby control the transmission of a discovery signal. As a result, interference that is based on the transmission of a discovery signal can be suppressed. Thus, the D2D ProSe can be effectively utilized.

Other Embodiments

In the aforementioned embodiment, the UE 100 may transmit, to the eNB 200, a message requesting permission for transmitting a commercial discovery signal in the second frequency band different from the first frequency band.

In the aforementioned embodiment, the eNB 200 may transmit other information for determining whether the UE 100 is allowed to transmit a message for requesting permission, in addition to the threshold value for determining whether the UE 100 is in the partial coverage state. For example, the eNB 200 may transmit information indicating that only a UE 100 that supports the transmission of a discovery signal for public safety is allowed to transmit a message for requesting permission.

In the aforementioned embodiment, the eNB 200 may transmit the response message to the UE 100-1 only if the transmission of a discovery signal is refused. In this case, the UE 100 may start the transmission of a discovery signal if the response message is not received after a predetermined time has elapsed from when a message requesting permission had been transmitted.

In the aforementioned embodiment, if the response message does not include the resource information and the pool information, the UE 100 can transmit a discovery signal using a radio resource in the pre-configured resource pool.

In the aforementioned embodiment, if the UE 100 executes a dual connection method (Dual Connectivity) or carrier aggregation, the UE 100 can execute the aforementioned operation using a primary cell (PCell) as a serving cell.

In the aforementioned embodiment, an LTE system has been described as an example of a mobile communication system. The mobile communication system, however, is not limited to the LTE system. An embodiment of the present discloser may be applied to a system other than the LTE system.

The invention claimed is:

1. A communication method, comprising:
   transmitting, by a base station managing a cell operated in a first frequency, to a radio terminal connected to the cell, a first message including first information indicating a first threshold value;
   transmitting a request message to the base station, by the radio terminal, in response to Reference Signal Received Power (RSRP) of a radio signal received from the cell being below the first threshold value, the request message requesting transmission of a discovery signal for public safety in a second frequency band different from the first frequency;
   receiving, by the base station, the request message; and
   transmitting, by the base station to the radio terminal, a second message including second information on radio resources to be used in transmission of the discovery signal in the second frequency, on a basis of the request message.

2. The communication method according to claim 1, wherein
   the second message includes information indicating whether the radio resources are for public safety.

3. The communication method according to claim 1, wherein
   in the transmitting the request message, the radio terminal transmits the request message to the base station when the radio terminal determines that the radio terminal is allowed to transmit the request message.

4. The communication method according to claim 1, wherein
   the first information further includes a second threshold value,
   in the transmitting the request message, the radio terminal transmits the request message to the base station in response to the RSRP of the radio signal received from the cell being below the first threshold value and above the second threshold value.

5. A radio terminal, comprising:
   a transmitter; and
   a receiver, wherein
   the receiver is configured to receive, from a base station managing a cell operated in a first frequency, a first message including first information indicating a threshold value,
   the transmitter is configured to transmit, to the base station, a request message in response to Reference Signal Receiver Power (RSRP) of a radio signal received from the cell being below the threshold value, the request message requesting transmission of a discovery signal for public safety in a second frequency band different from the first frequency, and
   the receiver is further configured to receive, from the base station, a second message based on the request message, wherein the second message includes second information on radio resources to be used in transmission of the discovery signal in the second frequency.

6. A processor for controlling a radio terminal connected to a cell operated in a first frequency, the processor configured to execute processes of:
   receiving from a base station managing the cell, a first message including first information indicating a threshold value;
   transmitting a request message to the base station in response to Reference Signal Received Power (RSRP) of a radio signal received from the cell being below the threshold value, the request message requesting transmission of a discovery signal for public safety in a second frequency band different from the first frequency; and
   receiving, from the base station, a second message based on the request message, wherein the second message includes second information on radio resources to be used in transmission of the discovery signal in the second frequency.

7. A base station configured to manage a cell operated in a first frequency, comprising:
   a receiver; and
   a transmitter, wherein
   the transmitter is configured to transmit a first message including first information indicating a threshold value to a radio terminal connecting to the cell,
   the receiver is configured to receive, from the radio terminal connecting to the cell, a request message requesting transmission of a discovery signal for public safety in a second frequency band different from the first frequency, the request message being transmitted from the radio terminal in response to Reference Signal Received Power (RSRP) of a radio signal received by the radio terminal from the cell being below the threshold value, and
   the transmitter is further configured to transmit, to the radio terminal, a second message including second information on radio resources to be used in transmission of the discovery signal in the second frequency, on a basis of the request message.

* * * * *